TELEVISION TRANSMISSION DELAY COMPENSATION APPARATUS

Filed March 9, 1965

Inventor:
Johannes Günther
by Michael J. Striker
Attorney

United States Patent Office 3,420,951
Patented Jan. 7, 1969

3,420,951
TELEVISION TRANSMISSION DELAY COMPENSATION APPARATUS

Johannes Günther, Darmstadt-Eberstadt, Germany, assignor to Fernseh G.m.b.H., Darmstadt, Germany
Filed Mar. 9, 1965, Ser. No. 438,251
Claims priority, application Germany, Mar. 17, 1964, F 42,329
U.S. Cl. 178—69.5 6 Claims
Int. Cl. H04l 7/00

ABSTRACT OF THE DISCLOSURE

At least one remotely located video signal source receives synchronizing signals from a central synchronizing signal generator by way of a signal path which introduces a first signal delay. The signal source yields a video signal including a synchronizing signal component of which the phase is controlled by the synchronizing signals. The video signal source is connected to a terminal position close to said central synchronizing signal generator by way of a video channel introducing a second signal delay. A phase comparator at said terminal position develops an error voltage as a function of the phase difference between the synchronizing component of the video signal and a synchronizing signal derived from the central synchronizing signal generator. This error voltage is applied to control the delay of a delay device connected to control the phasing of the synchronizing component of the video signal.

Figure 1:
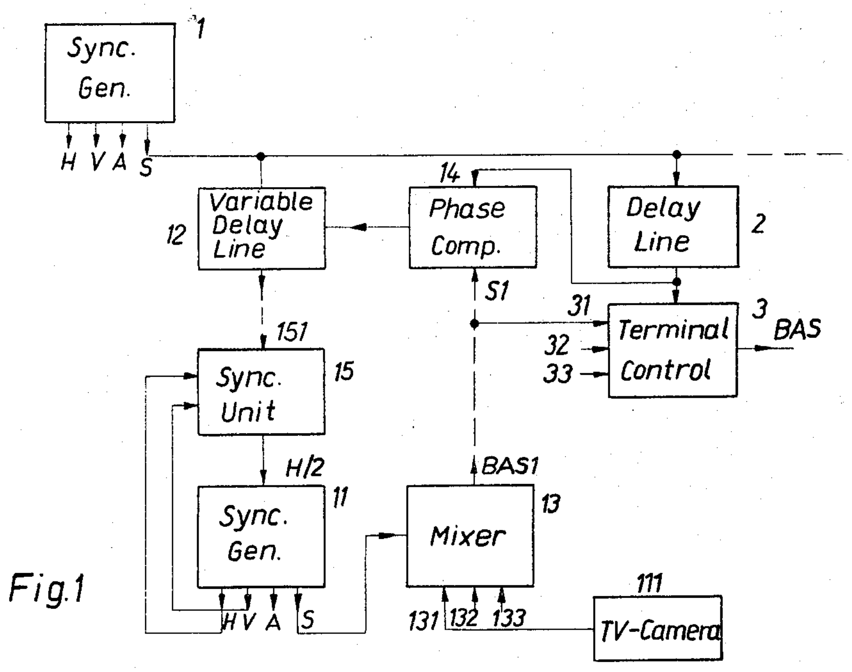

This invention concerns television signal control apparatus and more particularly relates to apparatus for synchronizing television signal sources, which are disposed apart from one another, with apparatus at a central position. A particular, though not exclusive, use of such apparatus is in obtaining uniform synchronization of video signal sources in television studios, especially large studio complexes including remote studios.

The synchronization of the various video signal sources, such as television cameras, film- and slide-scanning equipments, television tape recording apparatus, and so on, in a television studio is usually effected by a central synchronizing signal generator. In large studio complexes the individual studios or suites of studios are often equipped with individual local synchronizing signal generators, so that each studio or suite may be operated independently, in order for example to carry out rehearsals, or so that a television programme may be performed in advance of its transmission time and stored in the form of a recording.

In large studio complexes it may be found that the connection cables between the individual studios, by which the video signals are transmitted to the terminal control position at which is effected the video mixing by which video signals from different sources are combined to form a television programme, and also the impulse leads used for distributing the various synchronizing impulses, may have lengths such that the signal transit time in the connecting cables can no longer be ignored. The video signals supplied by the various video signal sources in the studio complex to the central terminal control position then no longer coincide in time with the necessary degree of accuracy. This has the disadvantage that on cutting from one video signal to another the synchronization of the television receivers supplied with the final signal is upset, since receivers which employ flywheel synchronization are not able to follow sudden changes in the timing of the synchronizing pulses.

To overcome this difficulty a system for the synchronization of several pickup devices from a central position has already been proposed in which the synchronizing information is transmitted from the central position to the pickup devices with an advance in timing of which the amount is automatically regulated by comparison of the synchronizing information mixed with the video signal arriving for transmission with the synchronizing information generated for the central position itself, so that correct timing of the synchronizing information in all transmitted signals is ensured. In this known system special synchronizing signal sources are necessary at the central position for each individual video signal source, in addition to the master pulse generator. It is an object of the invention to provide a synchronization system which is comparatively simple and reliable in operation.

Television signal control apparatus according to the present invention includes at least one video signal source receiving synchronizing signals from a central synchronizing signal generator by way of a signal path introducing a first signal delay and yielding a video signal including a synchronizing component of which the phasing is controlled by said synchronizing signals, said source being connected to a terminal position by way of a video channel introducing a second signal delay, and including at said terminal position a phase comparator developing an error voltage related to the phase difference between said synchronizing component of said video signal and a synchronizing signal derived from said central synchronizing signal generator, said error voltage being applied to control the delay of a signal delay device connected to control the phasing of said synchronizing component in said video signal.

In one embodiment of apparatus according to the invention a synchronizing signal generated by a central synchronizing signal generator is applied to a central video mixer as a delayed synchronizing signal by way of a delay device having a delay greater than the maximum go-and-return transit time of a signal sent to and returned from said signal source and is also applied to the video signal source by way of a delay device having a variable delay, controlled by an error voltage, derived by phase comparison of the synchronizing component contained in the video signal received at said terminal position from said source with said delayed synchronizing signal, in such a manner as to reduce any difference in phase between said component and said signal.

In another embodiment of apparatus according to the invention synchronizing signals locally generated at a video signal source are applied by way of a variable delay device to a first phase comparator in which they are compared in phase with synchronizing signals transmitted to said source from a central synchronizing signal generator and an error signal derived as a result of such first phase comparison is applied to control the phase of a master oscillator, controlled in frequency by synchronizing signals transmitted thereto from said central synchronizing signal generator, from which said locally generated synchronizing signals are derived, and the signal delay introduced by said variable delay device is controlled by a further error signal derived by comparison in a second phase comparator at said terminal position of the phase of the synchronizing component contained in the video signal transmitted thereto from said source with the phase of the synchronizing signal from said central synchronizing generator.

Apparatus according to the invention possesses the advantage that the necessary exact synchronization of the video signals transmitted from individual remote sources to the central vision mixer is effected automatically, independently of the manner in which the individual sources are connected to the central video mixer and the resulting alterations in the lengths of the connecting leads. If apparatus according to the invention is also provided for operation between the individual studios, then in case of need any individual studio can take over the function of the central position.

A further advantage of the invention is that only the complete synchronizing signal need be transmitted from the central position to the individual studios or between these latter. Thus only a single pulse lead is necessary, while in the arrangements formerly used it was necessary for all the forms of pulse generated by the central synchronizing generator (horizontal synchronizing pulses H, vertical synchronizing pulses V, blanking signal A and composite synchronizing signal S) to be distributed. The synchronizing signal S contains all the information necessary for synchronization in the horizontal and vertical directions. The saving in cabling, pulse distributors and pulse delay devices for all the individual pulses (H, V, A, S) is considerable and in the usual case is much greater than the increased expense for the separation of the various synchronizing pulses from the composite synchronizing signal at the individual studios, or at the video signal sources, by means of additional synchronizing pulse generators or discriminator circuits.

Figure 2:
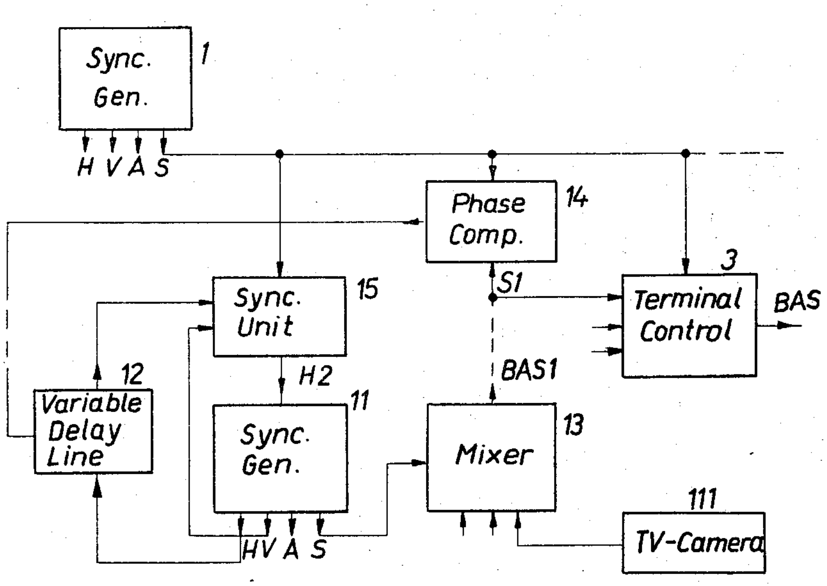

Further objects and advantages will become more apparent from the following description taken in conjunction with the drawing, in which like elements are denoted by like reference numerals. In the drawings:

FIGURE 1 is a block circuit diagram of an embodiment of apparatus according to the invention in which synchronizing signals transmitted from a central synchronizing generator to individual video signal sources are subject to appropriately controlled delay, and FIGURE 2 is a block schematic diagram of an embodiment of the invention in which controllable delay devices at the individual studios are employed to produce the desired state of synchronization.

In FIGURE 1, reference 1 denotes a central synchronizing signal generator. This is of conventional construction, in which the horizontal synchronizing signal H, the vertical synchronizing signal V, the blanking signal A and the composite synchronizing signal S are derived from a master oscillator operating at twice the line frequency by processes of frequency division and pulse shaping. The synchronizing signal S is fed by way of a delay device 2 with a pre-set delay to the terminal control position 3 including the main video mixer. The fixed delay introduced by device 2 is at least as great as the maximum delay, with respect to the synchronizing signals received at the central position from the synchronizing signal generator 1, of the synchronizing component of television signals reaching the central position from any of a plurality of spatially separated individual studios or video signal sources. As is indicated by the connections 31, 32, 33, television signals from any number of different positions or video signal sources may be received at the control position, though the apparatus at only one such position is shown in the figure as connected to the central position by way of lead 31. As shown in the figure, the individual studio, separated in space from the central position, may itself contain a video mixer 13 similar to that at the central position and to which again a number of video signal sources may be connected at 131, 132, 133. One such source only, a television camera 111 is shown as being connected to video mixer 13 by way of lead 131 but the other sources, such as film or slide scanners, or tape recording apparatus may also serve as signal sources. It is assumed that the individual studio is equipped with a local pulse generator 11, which may be constructed in the same manner as the pulse generator 1.

The coupling of the pulse generator 11 with the central synchronizing generator 1 is effected by means of a synchronizing unit 15. In this unit the horizontal and vertical synchronizing pulses H and V are derived from the composite synchronizing signal S received at 151 from the central synchronizing signal generator and are compared with the horizontal and vertical pulses H and V generated by the pulse generator 11. The error signals derived as a result of these comparisons are used to control the frequency of an oscillator contained within the synchronizing unit 15, which takes the place of the master oscillator in the pulse generator 11.

From the television signal BAS 1 transmitted from video mixer 13 to the terminal control unit 3, the synchronizing component S 1 is separated by means of an amplitude discriminator (not shown in the figure) and is compared as regards timing with the synchronizing signal generated in the central synchronizing signal generator 1 and delayed by the maximum transit time in delay line 2. The error signal corresponding to the difference in timing of the compared signals is now made use of to control the delay experienced by the synchronizing signal transmitted to synchronizing unit 15 as this signal passes through the variable delay device provided by delay line 12. This automatically ensures that the total delay experienced by the signals returning to the central position from a signal source is equal to the fixed delay introduced by the delay line 2, so that all the television signals from the video signal sources appear with the same timing at the terminal control position 3, independent of the lengths of the connecting cables.

In the case where the individual studies are equipped with local pulse generators, additional to the central synchronizing signal generator, the arrangement shown in FIGURE 2 may be used to ensure that the synchronizing pulses applied to the video signal source are automatically shifted in time in such a manner that in the terminal control position 3 the video signals arrive with their synchronizing components synchronous with the synchronizing signal from the central synchronizing signal generator 1, independent of the lengths of the leads. In this case a constant delay of those synchronizing signals from the central synchronizing signal generator which are applied to the terminal control may be dispensed with.

In the same manner as in the arrangement of FIGURE 1, the error signal is obtained by comparison of the timing of the synchronizing pulses S from the central synchronizing signal generator 1 with that of the synchronizing component extracted from the incoming television signal BAS 1 in a comparison device 14 at the terminal control position. The controllable delay lines are not situated in the central position, but in the neighbourhood of the local pulse generators of the individual studios. In FIGURE 2 there is again illustrated one such individual studio with a local video mixer 13, to which the video signal sources, one of which is indicated by a television camera 111, are connected. In this case it is not the synchronizing signal S applied to the synchronizer unit, which is delayed, means of the controllable delay device constituted by delay line 12 in accordance with the magnitude of the error signal, but the horizontal synchronizing pulses H generated by the pulse generator 11, which are compared as regards timing in the synchronizer unit 15, with the horizontal synchronizing pulses H derived from the central synchronizing signal generator 1. Horizontal control pulses H1*z*, resulting from said comparison are applied to the local synchronizing signal generator 11. In this manner the synchronizing pulses generated by the local synchronizing generator 11 are advanced by the same amount as the signals in the system are delayed by the transit times in the connecting leads and unit.

In the arrangements shown in FIGURES 1 and 2 it is advantageous to employ controllable delay lines which are composed of elementary delay lines which, as described and claimed in co-pending patent application (Ser. No. 400,866) are connected in circuit by control means actuated by the error voltage through the intermediary of appropriate analogue/digital control devices. As compared to the known variable delay lines employing variable capacitors, the advantage is thus obtained that the range of control encompasses the whole delay time, and not only a fraction of this time. In addition, amplitude-dependent alterations of signal delay, originating in the delayed signal itself, are avoided so that the signal may have a greater amplitude than that which can be handled by a delay line using variable capacitors.

What I claim is:

1. Control apparatus for generating a plurality of centrally synchronized television signals from terminal control means at a central location, comprising in combination, central synchronizing signal generating means at said central location, adapted to generate central synchronizing signals; at least one source of video signals having synchronizing components, located at a remote location; means for transmitting said video signals from said source of video signals at said remote location to said terminal control means at said central location, said transmission causing a first signal delay; local synchronizing signal generating means for adjusting the phase of said synchronizing components of said video signal, located at said remote location; means for transmitting said central synchronizing signals from said central location to said local synchronizing signal generating means, to control the phase thereof, said transmission causing a second signal delay; phase comparator means located at said central location, for generating an error signal as a function of the difference in phase between said synchronizing components of said video signal and said central synchronizing signals; and means for changing the phase of said locally generated synchronizing signals as a function of said error voltage in such a manner that said error voltage decreases to zero.

2. A system as set forth in claim 1 wherein said means for changing the phase of said locally generated synchronizing signals comprises variable delay means, said variable delay means having a delay which varies as a function of applied voltage; and means for applying said error voltage to said variable delay means in such a manner that said delay varies as a function thereof.

3. A system as set forth in claim 2 wherein said variable delay means are connected in such a manner that the delay thereof is applied to said central synchronizing signals before transmission to said local synchronizing signal generating means; also comprising fixed delay means adapted to delay said central synchronizing signals thus generating delayed central synchronizing signals, said fixed delay being at least equal to the maximum delay resulting from signal transmission from said central location to said remote location and return; and means for applying said delayed central synchronizing signals to said terminal control means and to said phase comparator means.

4. A system as set forth in claim 2 also comprising mixer means, at said remote location, for mixing signals from at least one source of video signals with said local synchronizing signals.

5. A system as set forth in claim 2 wherein said local synchronizing signal generating means are adapted to generate horizontal scan frequency signals; wherein said variable delay means delay said horizontal scan frequency signals as a function of said error voltage, thus generating delayed horizontal scan frequency signals; also comprising means for deriving a central horizontal scan frequency signal from said central synchronizing signals received at said remote location; means for comparing said central horizontal scan frequency signals to said delayed horizontal scan frequency signals and generating a horizontal control signal as a function of the phase difference between said two signals; and means for applying said horizontal control signal to said local synchronizing signal generating means, to control the phase thereof.

6. A system as set forth in claim 1 wherein said terminal control means comprise central mixer means for mixing said central synchronizing signals with video signals from at least one remotely located source of video signals.

References Cited

UNITED STATES PATENTS

| | | | |
|---|---|---|---|
| 2,278,788 | 4/1942 | Knick | 178—69.5 |
| 3,165,585 | 1/1965 | James | 178—69.5 |
| 3,311,702 | 3/1967 | Legler | 178—69.5 |

ROBERT L. GRIFFIN, *Primary Examiner.*

R. L. RICHARDSON, *Assistant Examiner.*